US011323678B2

(12) United States Patent
Bogusz et al.

(10) Patent No.: US 11,323,678 B2
(45) Date of Patent: May 3, 2022

(54) METHOD OF AND APPARATUS FOR PROCESSING FRAMES IN A DATA PROCESSING SYSTEM

(71) Applicant: ARM Limited, Cambridge (GB)

(72) Inventors: Michal Bogusz, Cambridge (GB); Piotr Chrobak, Cambridge (GB); Damian Modrzyk, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 14/949,640

(22) Filed: Nov. 23, 2015

(65) Prior Publication Data
US 2016/0156893 A1      Jun. 2, 2016

(30) Foreign Application Priority Data

Dec. 2, 2014    (GB) ..................... 1421399

(51) Int. Cl.
*H04N 9/75* (2006.01)
*H04N 5/272* (2006.01)
*H04N 5/232* (2006.01)

(52) U.S. Cl.
CPC ........... *H04N 9/75* (2013.01); *H04N 5/23229* (2013.01); *H04N 5/272* (2013.01)

(58) Field of Classification Search
CPC ....................................................... H04N 9/75
USPC ....................................................... 348/587
See application file for complete search history.

(56) References Cited

U.S. PATENT DOCUMENTS

| 5,313,275 A * | 5/1994 | Daly ................ H04N 9/75 348/592 |
|---|---|---|
| 6,084,982 A | 7/2000 | Challapali et al. |
| 2002/0051007 A1* | 5/2002 | Kitagawa .............. H04N 19/80 345/660 |
| 2003/0001973 A1* | 1/2003 | Roever .................. H04N 5/275 348/590 |
| 2012/0044420 A1* | 2/2012 | Payson .................... H04N 5/45 348/571 |
| 2014/0178029 A1* | 6/2014 | Raheman .............. G06T 19/006 386/224 |

(Continued)

FOREIGN PATENT DOCUMENTS

| CN | 1520682 | 8/2004 |
|---|---|---|
| EP | 1110382 | 3/2006 |

OTHER PUBLICATIONS

GB Search Report dated May 18, 2015, GB Patent Application No. GB1421399.5.

(Continued)

*Primary Examiner* — Brian P Yenke
*Assistant Examiner* — Justin Sanders
(74) *Attorney, Agent, or Firm* — Vierra Magen Marcus LLP

(57) ABSTRACT

An apparatus for providing a foreground frame to be composited with a background frame in a chroma-keying arrangement, each of the foreground frame and the background frame comprising one or more regions that together form the respective frame. A detection module determines whether each frame region has a predetermined colour value and generates and stores chroma keying information based on the determination. Control circuitry then controls image processing to be performed on the region according to the stored chroma keying information.

14 Claims, 13 Drawing Sheets

(56) References Cited

U.S. PATENT DOCUMENTS

2017/0116750 A1* 4/2017 Pond .................. G06T 7/11

OTHER PUBLICATIONS

M. Naccari, M. Mrak, "Binary alpha channel compression for coding of supplementary video streams", Proc. of the IEEE 15th International Workshop on Multimedia Signal Processing, pp. 200-205, 2013.

B. Erol, and F. Koss, "Color Content Matching of MPEG-4 Video Objects", PSM 01 Proc. of the Second IEEE Pacific Rim Conference on Multimedia: Advances in Multimedia Information Processing, pp. 891-896, 2001.

T. Chen, C.T. Swain, and B.G.Haskell, "An approach to region coding for content-based scalable video", Proc. of the International Conference on Image Processing, vol. 3, pp. 399-402, 1996.

T. Chen, C.T. Swain, and B.G.Haskell, "Coding of Subregions for Content-Based Scalable Video", IEEE trans. on Circuits and Systems for Video Technology, pp. 256-260, 1997.

J. Ostermann, E.S. Jang, J.-S. Shin, and T. Chen, "Coding of Arbitrary Shaped Video Objects in MPEG-4", Proc. of the International Conference on Image Processing, vol. 1, pp. 496-499, 1997.

H. Agata, A. Yamashita, and T. Kaneko, "Chroma Key Using a Checker Pattern Background", IEICE trans. Inf. & Syst., vol. E90-D, 2007.

H. Agata, A. Yamashita, and T. Kaneko, "Every color chromakey", Proc. on 19th International Conference on Pattern Recognition, p. 1-4, 2008.

Greenscreen and Bluescreen Checklist available at: http://generalspecialist.com/greenscreen-and-bluescreen-checklist/.

Smith, et al., A Survey of Compressed Domain Processing Techniques, Cornell University, available at: http://www.cs.cornell.edu/Info/Projects/zeno/Papers/cdpsurvey/paper.html.

Chinese Office Action dated Sep. 19, 2019, Chinese Patent Application No. CN201510867983.3.

Chinese Office Action dated Aug. 4, 2020, Chinese Patent Application No. CN201510867983.3.

UK Office Action dated Sep. 23, 2020, UK Patent Application No. GB1421399.5.

UK Office Action dated Apr. 1, 2021, UK Patent Application No. GB 1421399.5.

Chinese Office Action dated Mar. 3, 2021, Chinese Patent Application No. CN201510867983.3.

Chinese Office Action dated Dec. 29, 2021, Chinese Application No. 201510867983.3.

Korean Office Action dated Feb. 28, 2022, Korean Application No. 2015-0166124.

* cited by examiner

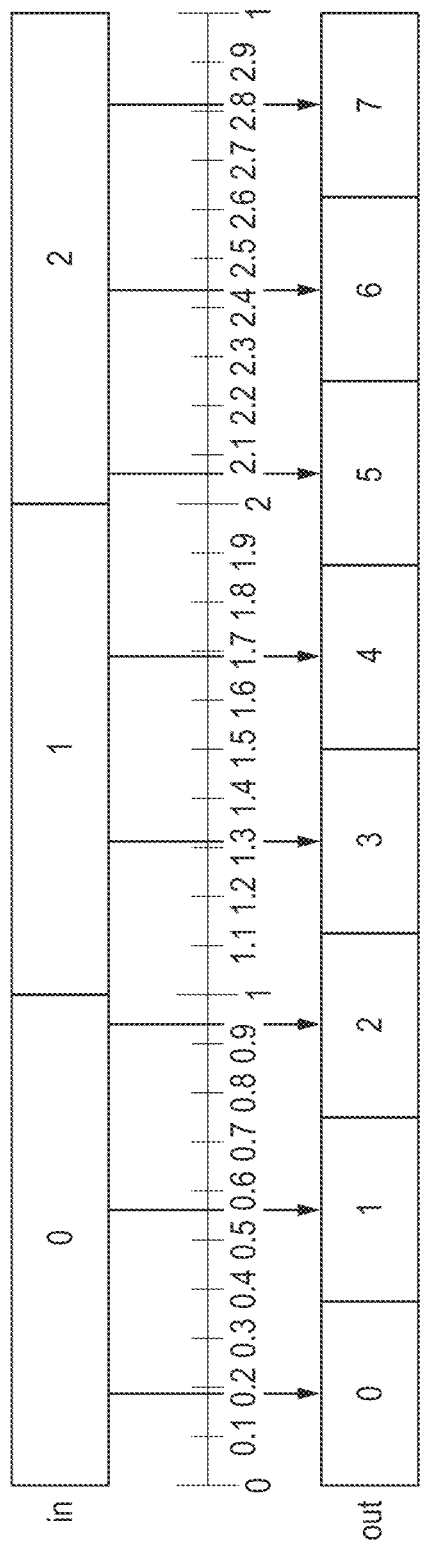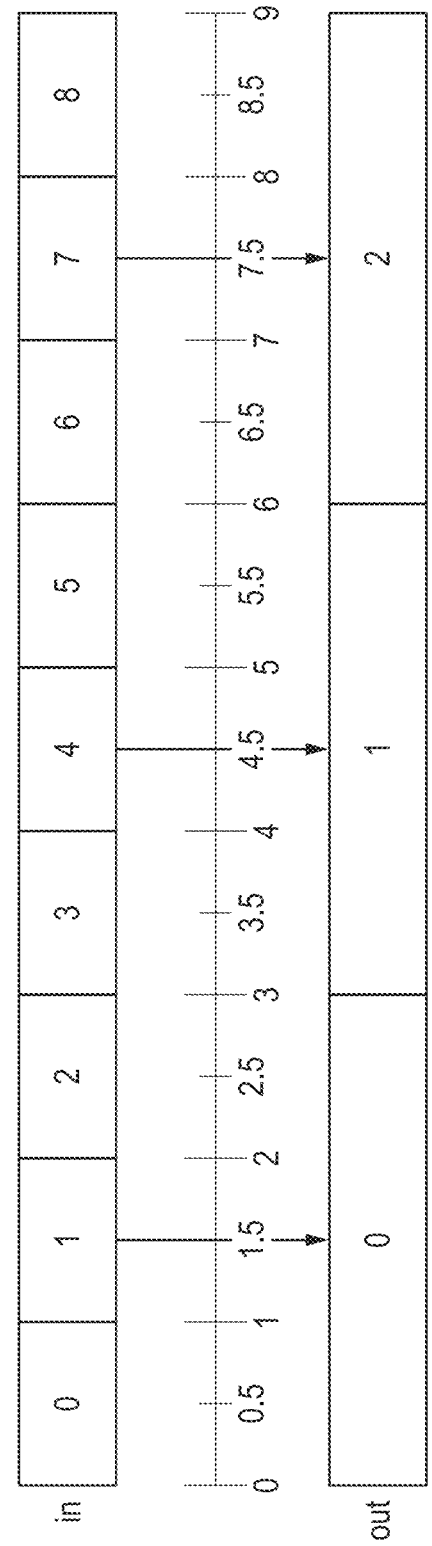

METHOD OF AND APPARATUS FOR PROCESSING FRAMES IN A DATA PROCESSING SYSTEM

BACKGROUND

The technology described herein relates to the field of chroma keying. In particular, the technology described herein relates to methods of and apparatus for processing a foreground frame that is to be composited with a background frame in a chroma keying process.

Chroma key compositing or chroma keying is a technique for compositing a foreground image with a background image (or a foreground video stream with a background video stream) according to the colour hues (chroma range) of the images. One or more pixels of a foreground frame are selected to be replaced by pixels of a background frame during composition, and the pixels that are to be removed from the foreground frame are identified by having a defined colour value, or a keying colour value, for example green. These foreground pixels that have the keying colour value are commonly referred to as "keyed pixels".

It will be appreciated in this regard that a given frame being processed generally comprises a plurality of pixels (sampling positions) (an array of data positions) that together form the frame. Here, a pixel corresponds to one sampling position. For each pixel (sampling position) of the frame, a data value or values (e.g. RGB values) may be stored, and each data value may be represented, for example, by a number of bits, such as an 8-bit number (where the frame is stored in RGB888 format, for example).

A schematic diagram illustrating a simplified chroma keying operation is shown in FIG. 1. When a foreground frame 100 is to be composited 104 with a background frame 101, the value of each pixel of the foreground frame is compared 102 with a keying colour value 103, such that foreground pixels that are keyed pixels are replaced by pixels of the background frame, and only the desired foreground objects are composited with the background frame. A foreground object may for example be the text of subtitles, a presenter of weather forecast, etc. and the background may for example be a weather map.

Chroma keying techniques may be implemented in data (image) processing systems. One or more other image processing blocks may also be implemented in the same data processing system. In this case, the foreground image and/or the background image may be processed by the one or more other image processing blocks before the chroma keying operation and composition are performed.

A conventional implementation of a chroma keying technique in data processing systems is schematically shown in FIG. 2, where the detection of keyed pixels 220 in a foreground frame is performed after the foreground frame is processed 210. Pixels of a background frame is likewise processed 230 and the processed foreground and background frames are composited 240. In the conventional approach, all pixels in the foreground frame are processed even if one or more of the pixels are keyed pixels, which pixels would be replaced by pixels of the background image during composition. Thus, processing and bandwidth resources are consumed unnecessarily in some cases.

Some image processing operations are dependent on the data values of a group of pixels. Where such an operation is performed at a border between keyed pixels and a foreground object, if the input pixel values include a combination of values from one or more keyed pixels and one or more foreground object pixels, the values of the one or more foreground object pixels in the output pixel values may be influenced by the values of the keyed pixels in the input, and similarly, the values of the keyed pixels in the output may be influenced by the values of the foreground object pixels in the input. In the former case, the foreground object is distorted causing a loss of image quality, and in the latter case, the keyed pixels may not be detected and therefore may not be replaced by pixels of the background image.

An example of image processing that may be affected when it is performed at the border between keyed pixels and foreground object pixels is a filtering or other operation that takes as its input a "window" (group) of pixels from the frame, for example when an image is scaled by applying a scaling window or sharpened by applying a sharpening window. In conventional methods, when such a "window" operation is performed for an input pixel, the value of the resulting output pixel is determined not only by the value of the input pixel, but also the values of pixels surrounding the input pixel. The number of surrounding pixels that are used in the window operation depends on the size of the window. For example, for a 3×3 window, the window covers an area of 9 pixels, and so the operation takes the values of the input pixel as well as 8 other pixels surrounding the input pixel. Thus, if the filter window covers an area enclosing both keyed pixels and foreground object pixels, the value of the output pixel is then a result of a combination of keyed pixels and foreground object pixels.

An example of distortion caused by keyed pixels "bleeding" into a foreground object is shown in FIG. 3, in which keyed pixels are shown in white, foreground pixels are in dark grey and background pixels are in light grey. In the example, a 3×3 filter window is applied to a foreground frame 310. When the filter window is applied to a pixel 310-1 of the foreground frame 310, the filter window covers an area 310-2 which contains both keyed pixels and foreground pixels. When the filtering operation is performed on the pixel 310-1, its value is determined by the values of each of the pixels in the area 310-2. Thus, when the filtering operation has completed for every pixel of the foreground frame 310, distortions can be seen at the border 350 between the keyed pixels and the foreground pixels of a resulting frame 320. When a chroma keying operation is performed on the resulting frame 320 to detect and replace keyed pixels in the processed foreground frame, the distorted keyed pixels at the border are not detected, and so, when the processed foreground frame is composited with a background frame 330, the distortions remain in the composited frame 340 at the border 360 between the foreground pixels and the background pixels.

In conventional approaches, as shown schematically in an example in FIG. 4, distortion detection 401 and distortion correction 402 are performed after the chroma keying operation 102 and composition 104 to detect and correct the distortions in the foreground object. There are a number of methods for performing distortion detection and distortion correction. However, depending on the distortion detection method used, some distorted pixels may not detected. Moreover, as the removal of the distortions in the foreground object may sometimes require knowledge of the foreground frame before filtering is applied, and similarly the removal of the distortions in the background caused by keyed pixels not being detected may sometimes require knowledge of the background image before composition, a complete removal of all the distortions may not always be possible. Thus, such distortion correction methods are likely to only reduce the influence from the keyed pixels on the foreground object and background image, but unlikely to remove all distortions completely.

In view of the foregoing, it is desired to reduce unnecessary consumption of processing and bandwidth resources. It is further desired to reduce distortions in the composited image and thereby improve image quality.

BRIEF DESCRIPTION OF THE DRAWINGS

Embodiments of the technology described herein will now be described, by way of example only, with reference to the accompanying drawings, in which:

FIG. 14A schematically illustrates an example of the upscaling of chroma keying information; and FIG. 14B schematically illustrates an example of the downscaling of chroma keying information.

Like reference numerals are used for like features throughout the drawings, where appropriate.

DETAILED DESCRIPTION

Figure 1:
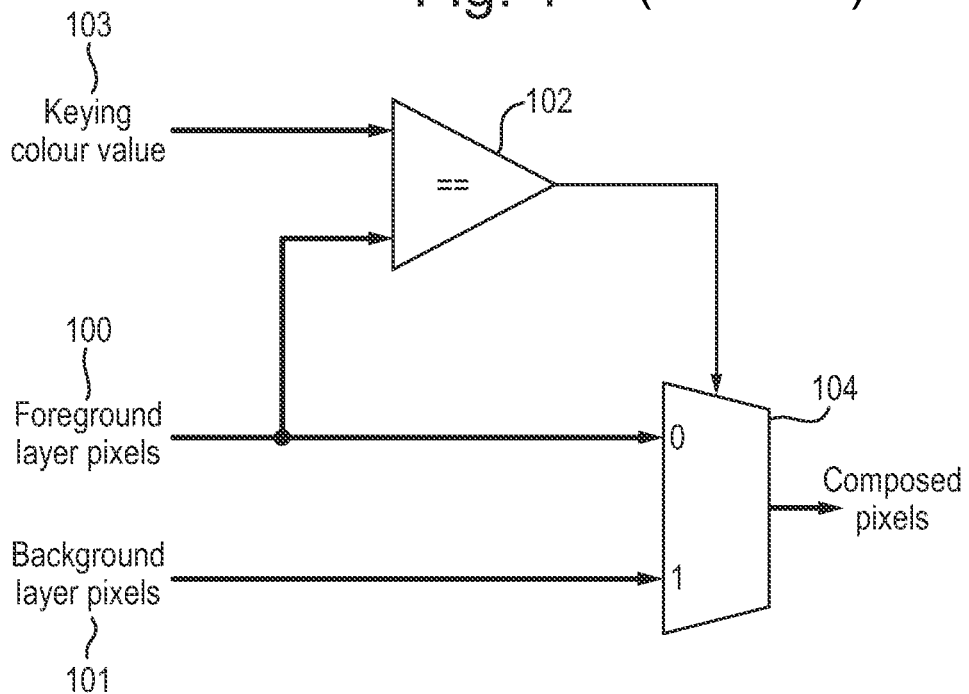
FIG. 1 is a simplified schematic diagram illustrating an example of chroma keying operation.
Figure 2:
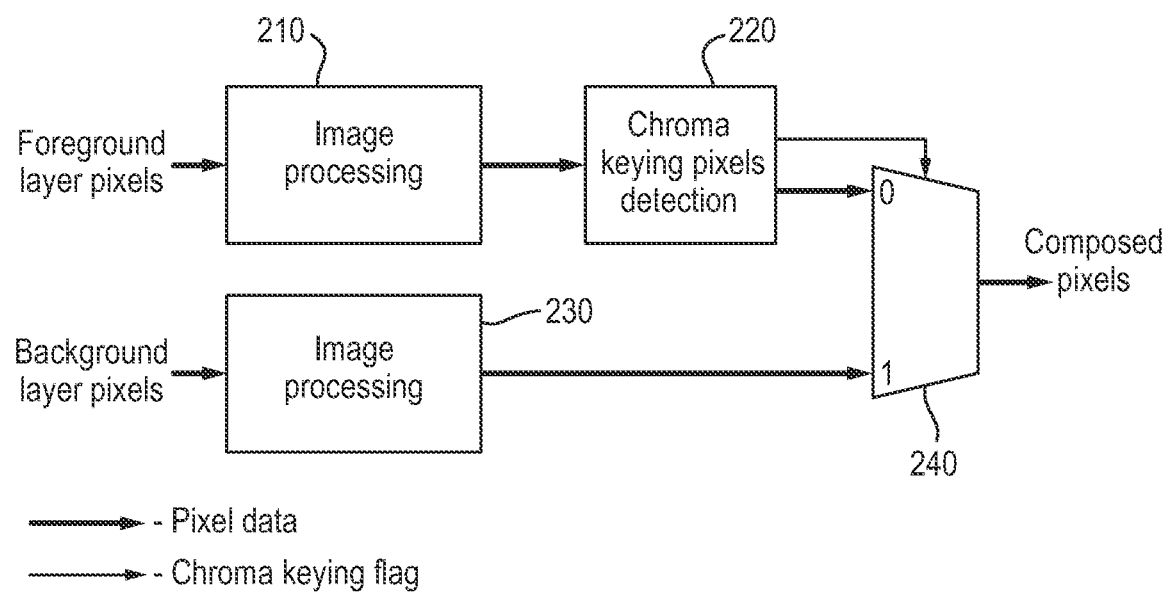
FIG. 2 is a schematic diagram illustrating an example of a conventional approach to chroma keying.
Figure 3:
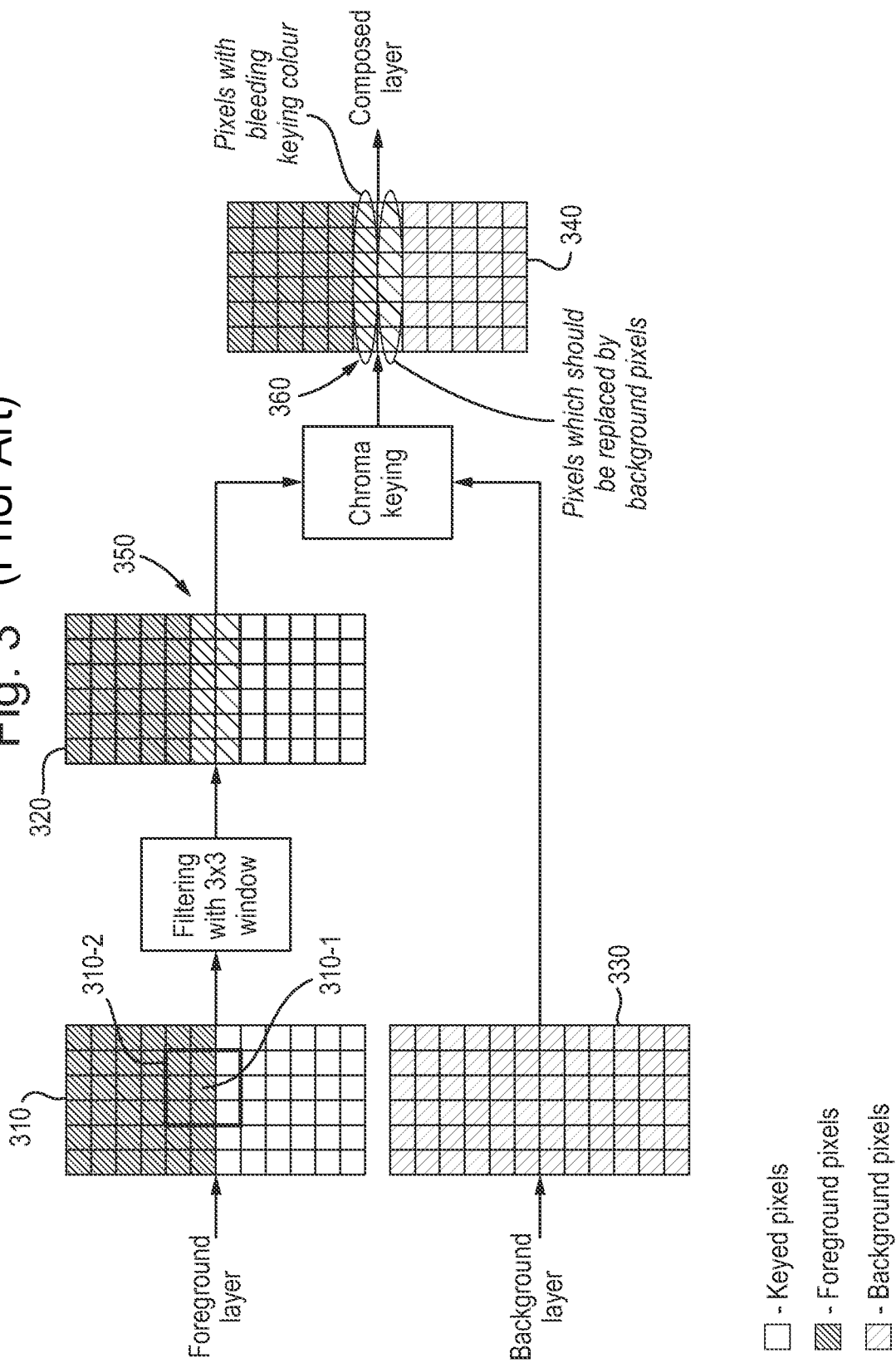
FIG. 3 schematically illustrates the generation of distortions in a composited frame.
Figure 4:
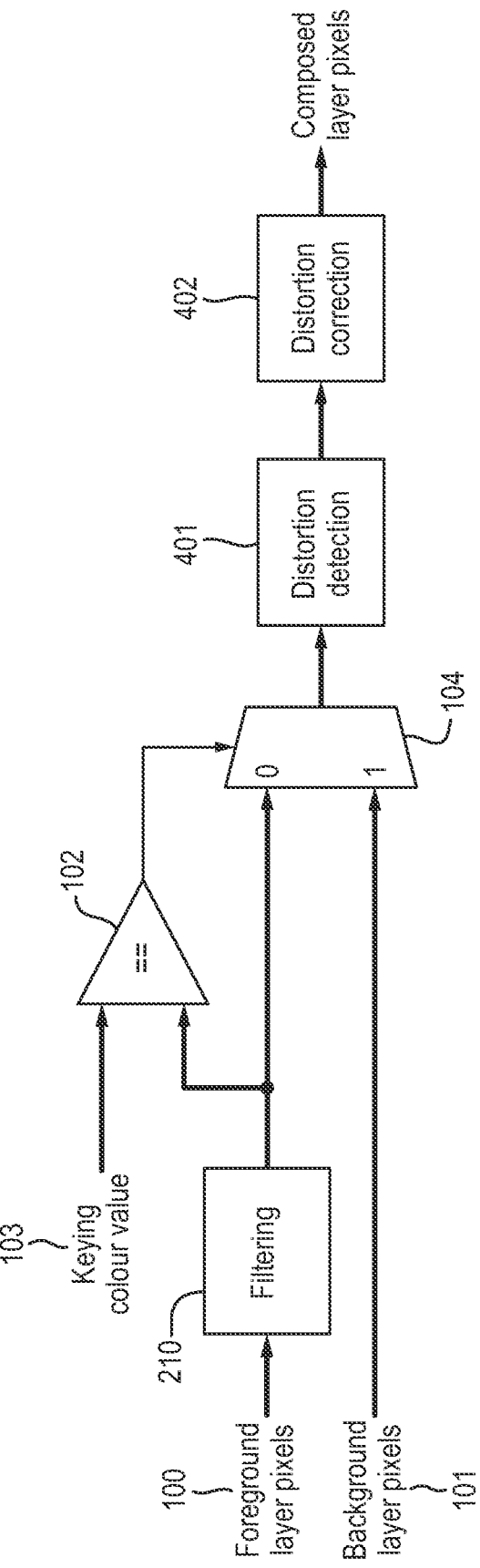
FIG. 4 is a schematic diagram illustrating an example of a conventional approach to applying chroma keying operation in a data processing system.

An embodiment of the technology described herein comprises a method for providing a foreground frame to be composited with a background frame, each of the foreground frame and the background frame comprising one or more regions that together form the respective frame. For at least one region of the foreground frame, the method comprises performing a detection on the foreground frame to determine whether the region has a predetermined colour value, e.g. a keying colour value, generating and storing chroma keying information based on the detection, and controlling image processing to be performed on the region of the foreground frame according to the stored chroma keying information.

The foreground/background frame may be divided into one or more regions in any suitable or desirable manner. In embodiments, each region corresponds to an individual pixel (sampling position) of the frame. However, in some embodiments, the frames may be divided into regions comprising more than one pixel (sampling position) which may be of the same or of various sizes as desired. The predetermined colour value may be a single value or range of values, and is in an embodiment a keying colour value that is set to identify pixels in the foreground frame that are to be replaced by pixels in the background frame during composition.

Another embodiment of the technology described herein comprises an apparatus for providing a foreground frame to be composited with a background frame, each of the foreground frame and the background frame comprising one or more regions that together form the respective frame. The apparatus may comprise a detection module for performing a detection on a region of the foreground frame to determine whether the region has a predetermined colour value and generating chroma keying information based on the detection, memory for storing the chroma keying information, and control circuitry for controlling image processing to be performed on the region according to the stored chroma keying information.

In embodiments, detection is performed on a foreground frame to generate chroma keying information before performing one or more image processing operations to the foreground frame. The chroma keying information generated as a result of the detection is stored and used during the one or more image processing operations. Thus, the chroma keying information can be considered to propagate with the foreground frame along a processing pipeline. Moreover, an image processing operation to be performed on the foreground frame is in an embodiment modified based on the chroma keying information, and so the image processing may be adapted according to the detection result of the foreground frame.

The stored chroma keying information may comprise any suitable or desirable information relating to the pixel values of the foreground frame. In embodiments, the chroma keying information indicates whether a region of the foreground frame has a predetermined colour value, e.g. the keying colour value. For example, in an embodiment, the chroma keying information may be stored by setting a flag to indicate whether a region has the keying colour value. In such an embodiment, an array of plural chroma keying flags may be provided, each corresponding to a region (e.g. a pixel) of the foreground frame to indicate if each corresponding region has the keying colour value or not. Thus, by reading the stored chroma keying information, it is possible to determine whether a region of the foreground frame has the keying colour value, i.e. whether the region will be replaced by a region of the background frame during composition or not, and modify an image processing operation to be performed on the region of the foreground frame accordingly.

The image processing operation to be performed on the foreground frame can be any suitable and desired processing operation that is to be performed in the foreground frame before it is composited with a background frame. The processing operation may be controlled (and, in an embodiment, modified) in any suitable or desirable manner using the stored chroma keying information. In embodiments, the image processing operation to be performed on a region of the foreground frame may be omitted entirely if the chroma keying information indicates that the region has the keying colour value.

The Applicants have recognised that, in conventional methods where a chroma keying operation to identify keyed pixels from foreground object pixels in a foreground frame is only performed after the foreground frame has been processed, every pixel in the foreground frame would be processed in the same manner irrespective of whether it is a keyed pixel or a foreground object pixel. Moreover, the keyed pixels in the foreground frame would be replaced by pixels in the background frame during composition and therefore any processing performed on the keyed pixels is in fact unnecessary.

Thus, according to embodiments of the technology described herein, by obtaining chroma keying information of a foreground frame before performing processing on the foreground frame, the processing to be performed may be modified as desired according to the obtained chroma keying information.

The technology described herein facilitates this by performing chroma keying determining on a foreground frame, before image processing is performed on the foreground frame, to detect regions, e.g. individual pixels or groups of pixels, in the foreground frame that have the keying colour value, thus indicating that these regions will be replaced by pixels of a background frame when the foreground frame is composited with the background frame. In embodiments, the detection generates chroma keying information that identifies whether a region in the foreground frame has the keying colour value, and this chroma keying information is stored and propagates with the foreground frame, e.g. through a processing pipeline. Using the stored chroma keying information, processing to be performed on the foreground frame may be modified based on whether a region has the keying colour value or not. Where a region is identified as having the keying colour value, it is known that the region will be replaced by pixels in the background frame during composition, and so any processing to be performed on the region would be unnecessary. Thus, in an embodiment, the image processing to be performed on a region is omitted if the chroma keying information indicates that the region has the keying colour value.

The chroma keying information obtained for a foreground frame may propagate unaltered with the foreground frame through to composition. Alternatively, if a scaling operation is to be performed on the foreground frame a scaling ratio, it may be desirable to modify the chroma keying information based on the same scaling ratio. For example, where the chroma keying information of the foreground frame is an array of chroma keying flags each corresponding to a pixel of the foreground frame, it may be able to scale the array of chroma keying flags by the same scaling ratio. This ensures that the chroma keying information retains its correspondence with the regions of the foreground frame after the foreground frame has been upscaled or downscaled.

Embodiments of the technology described herein may be applied to any one or more processing operations to be performed on a foreground frame to modify the one or more processing operations based on the chroma keying information obtained by detection of the foreground frame. In embodiments where the processing to be performed on the foreground frame is a window operation that applies e.g. a filter window to one or more or all of the regions of the foreground frame, the window operation may be modified.

In a window operation in which a window of a predetermined size covers an area of a frame that comprises the pixel being operated on and one or more surrounding pixels, the output value of a pixel being operated on is dependent on the input values of the surrounding pixels as well as its own. The Applicants have recognised that, when the pixel being operated on is a keyed pixel, it will be replaced by a pixel of the background frame during composition, and so the operation is unnecessary. The Applicants have further recognised that, in some cases, it may even be undesirable to perform the window operation on the keyed pixel as this may change the value of the pixel in such a way that it no longer has the keying colour value, in which case it may not be identified and replaced by a background pixel during composition, thus causing distortion.

According to embodiments, if the chroma keying information indicates that the region to be operated on has the keying colour value, the operation to be performed on the region may be omitted. Thus, it is possible to reduce the amount of processing performed by the data processing system, and furthermore reduce the likelihood of distortions in the composited frame.

In addition or alternatively, the window operation to be performed on a region may be omitted if the chroma keying information indicates that all surrounding regions that are covered by the window have the keying colour value. In this case, since the surrounding regions all have the keying colour value, if the window operation is performed on the region using values of the surrounding regions, the value of the region after the operation may be influenced by the keying colour values of the other regions. For example, if the region to be operated on is a foreground object pixel, the window operation may lead to the keying colour "bleeding" into the foreground object. Thus, by omitting the filtering operation in this case, distortions of the region to be operated on can be avoided, and the amount of processing to be performed by the data processing system can be reduced.

According to embodiments of the technology described herein, when a region of the foreground frame is being processed by a processing operation in which the output value of the region is determined by values of the surrounding regions as well as its own value, such as a filtering operation using a filter window, the operation is in an embodiment omitted when the region being operated on has the keying colour value, and/or if all of the other, e.g. surrounding, regions that are to be used for the processing operation (e.g. that are covered by the window) have the keying colour value. It is therefore possible to avoid unnecessary processing and thereby reduce power and bandwidth consumption. It is moreover possible to reduce the amount of distortions of the foreground object and/or keyed pixels, thereby improving the image quality of the final composited frame.

In some examples, when a processing operation to be performed on a region of the foreground frame is dependent on the values of the surrounding regions, e.g. filtering using a filter window, and the surrounding regions include a combination of keyed pixels and foreground object pixels, then the operation must be performed as the value of the pixel after the processing operation must take into account the values of the surrounding regions covered by the filter window that are part of the foreground object. In this case, the Applicants have recognised that the operation should disregard the input from the keyed pixels, as otherwise it may lead to distortions. Thus, according to embodiments of the technology described herein, if the region to be operated on does not have the keying colour value (i.e. is not one or more keyed pixels), the processing operation is modified by modifying the input to the, e.g. filter, window that is to be applied to the region based on the chroma keying information of the one or more surrounding regions that are covered by the, e.g. filtering, window.

Thus, according to embodiments of the technology described herein, processing operations to be performed on regions of a foreground frame that are unnecessary can be omitted by using chroma keying information obtained before performing the processing. Moreover, for processing operations that use pixel values of other, e.g. surrounding, regions as well as the region to be operated on, the processing operations are in an embodiment modified if the other, e.g. surrounding, regions include both foreground object pixels and keyed pixels. It is therefore possible to reduce power and bandwidth consumption and distortions in the final composited frame. Compared to conventional methods in which foreground pixels are processed irrespective of whether a pixel is a foreground object pixel or keyed pixel, and then the distorted pixels in the composited frame are detected and corrected, according to the embodiments, distortions are reduced in the composited frame and thus detection and correction of distortions may be omitted in some cases.

In an embodiment, when the processing operation to be perform on a region of the foreground frame is an operation that operates on a group of regions including the region and one or more other regions, and the output of the operation is dependent on the input values of each region of the group, then if the other regions included in the group comprise both foreground object pixels and keyed pixels, the processing operation is modified by modifying the input values to the operation such that the input value of a (and in an embodiment of each) region of the other regions that has the keying colour value is replaced by the input value of another region of the group that does not have the keying colour value (i.e. that is part of the foreground object).

In an embodiment, when the processing operation to be perform on a region of the foreground frame is an operation such as a filtering operation that uses a "window" that includes the region and one or more surrounding regions, then if the surrounding regions covered by the window include both foreground object pixels and keyed pixels, the processing operation is modified by modifying the input to the, e.g. filter, window such that the input value of a (and in an embodiment of each) region of the surrounding regions that has the keying colour value is replaced by the input value of an adjoining region that does not have the keying colour value (i.e. that is part of the foreground object).

In particular examples, where there is more than one region adjoining a surrounding region having the keying colour value, an adjoining region may be selected according to one or more predetermined rules to replace the input value of the region having the keying colour value. For example, rules may be set such that if a region amongst the surrounding regions has the keying colour value, then the input value for that region is in an embodiment replaced by the input value of the "middle" region, where the middle region is the region being operated on. Where the region in question is not adjoining the middle region, its window input may be replace by the value of an adjoining region that is a region of the surrounding regions and that has a value other than the keying colour value. In cases where the region in question adjoins a first region in the horizontal direction and a second region in the vertical direction, and both the first and second regions have values other than the keying colour value, rules may be set to, in an embodiment, select the value of the vertical adjoining region to replace the region in question over the value of the horizontal adjoining region, or alternatively, to, in an embodiment, select the value of the horizontal adjoining region over the value of the horizontal adjoining region, as desired.

Other arrangements would, of course, be possible.

In embodiments where the filter window covers an area that includes an odd number of regions, the middle region is (in an embodiment) the region that is located in the middle of the filter window. Where the filter window is two-dimensional, the middle region is in an embodiment the region that is located in the middle of the filter window in both dimensions. For example, for a 3×3 filter window, the middle region is the region located at the second column of the second row.

In embodiments where the filter window covers an area that includes an even number of regions, then one of the possible "candidate" "middle" regions is in an embodiment selected as the "middle" region. For a one-dimensional window, there are essentially two locations that are in the middle of the window. In this case, it may be arranged such that the two middle locations are selected alternately according to predetermined rules as the middle region of the window.

In an example, the filter window may be a polyphase filter, e.g. a polyphase scaling filter that has NP number of phases and NT number of taps (thus the filter window covers NT number of regions at each phase). If NT is an odd number, the middle region may simply be the region located at the ((NT+1)/2)th tap. If, on the other hand, NT is an even number such that the polyphase filter covers an even number of regions, it may be arranged such that the position of the middle region alternates between the two regions located at the (NT/2)th tap and the ((NT/2)+1)th tap. In this example, it may be possible to select a different region of the filter window as the middle region depending on the phase of the filter, and so rules may be set such that the middle region is the region located at the (NT/2)th tap when the phase of the polyphase scaling filter is greater than or equal to (NP/2), and the middle region is the region located at the ((NT/2)+1)th tap when the phase of the polyphase scaling filter is less than (NP/2). Thus, according to the embodiment, in cases where a processing operation input window covers an even number of regions, it may be arranged such that the two middle regions alternate to ensure a fair distribution.

Although the technology described herein has been described above primarily with reference to the processing of a given region of the foreground frame, as will be appreciated by those skilled in the art, the above operation is in an embodiment repeated for plural regions, and in an embodiment of each respective region, of the foreground frame. Once the complete foreground frame has been processed in this manner, it may then be stored and/or composited with the background frame using the chroma keying information, etc., as desired. The process is in an embodiment then repeated for subsequent foreground and background frames that are to be composited, etc.

The technology described herein may be implemented in any desired and suitable data processing system that is operable to generate frames, e.g. to be transmitted to an electronic display for display.

The data processing system that the technology described herein is implemented in may contain any desired, appropriate and suitable elements and components. Thus it may, and in an embodiment does, contain one or more or all of: a CPU, a GPU, a video processor (video engine/encoder-decoder), an image processor, a display controller, and appropriate memory for storing the various frames, chroma keying information and other data that is required.

The detection and generation of chroma keying information for a foreground frame may be performed by any suitable and desired component of the overall data processing system. For example, this could be performed by a CPU, GPU or separate processor (e.g. ASIC) provided in the system (in the system on-chip) or by the display controller for the display in question. The same element could perform all the processes, or the processes could be distributed across different elements of the system, as desired.

The foreground frame, background frame, composited frame, any other graphics frame, video frame, etc. may be stored in any suitable and desired manner in memory, in an embodiment in appropriate buffers. For example, a processed foreground frame and a processed background frame may in an embodiment be stored in respective output frame buffers. An output frame buffer may be an on chip buffer or it may be an external buffer. Similarly, an output frame buffer may be dedicated memory for this purpose or it may be part of a memory that is used for other data as well.

Similarly, the buffers that the foreground and/or background frames are first written to when they are generated (rendered) may comprise any suitable such buffers and may be configured in any suitable and desired manner in memory. For example, they may be an on-chip buffer or separate on-chip buffers, or may be an external buffer or buffers. Similarly, they may be dedicated memory for this purpose or may be part of a memory that is used for other data as well. The input frame buffers may, for example, be in any format that an application requires, and may, for example, be stored in system memory (e.g. in a unified memory architecture), or in graphics memory (e.g. in a non-unified memory architecture).

The technology described herein may be implemented in any suitable system, such as a suitably configured microprocessor based system. In some embodiments, the technology described herein is implemented in a computer and/or micro-processor based system.

The various functions of the technology described herein may be carried out in any desired and suitable manner. For example, the functions of the technology described herein may be implemented in hardware or software, as desired. Thus, for example, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

In an embodiment, the apparatus of the technology described herein comprises, and/or is in communication with, one or more memories and/or memory devices that store the data described herein, and/or that store software for performing the processes described herein. The apparatus may also be in communication with the host microprocessor, and/or with a display for displaying images based on the output of the system.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

The technology described herein is applicable to any suitable form or configuration of data processing systems, such as systems having a "pipelined" processing arrangement.

It will also be appreciated by those skilled in the art that all of the described embodiments and embodiments of the technology described herein may include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described.

Figure 5:
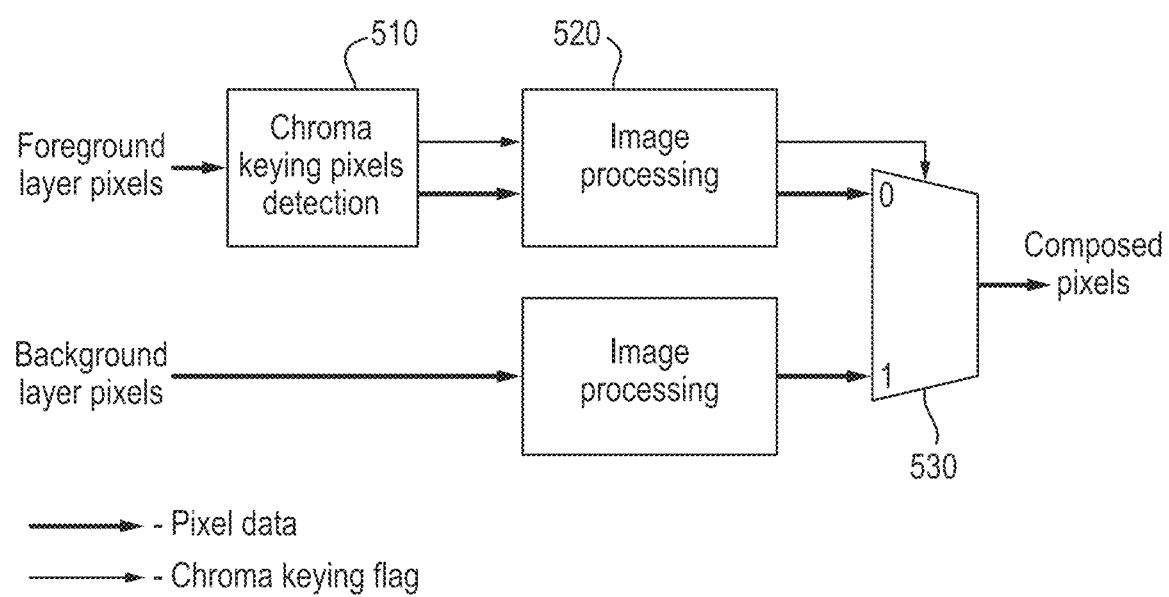
FIG. 5 is a schematic diagram illustrating an exemplary chroma keying technique according to an embodiment.

A schematic diagram of an exemplary method for implementing a chroma keying technique according to an embodiment is shown in FIG. 5, in which a foreground frame is composited with a background frame. According to the present embodiment, a detection 510 is performed, prior to performing image processing 520, on the pixels of the foreground frame to generate chroma keying information on the foreground frame. In the present embodiment, the pixel detection is performed so as to identify the keyed pixels in the foreground frame, and the chroma keying information indicates for a foreground frame pixel whether it has the keying colour value (i.e. is a keyed pixel). The chroma keying information thus generated propagates with the foreground frame through one or more image processing operations to composition 530 with the background frame.

In an example, the chroma keying information is in the form of one or more chroma keying flags, where a flag is set when a pixel is detected to have the keying colour value to indicate that the pixel is a keyed pixel. The chroma keying flag for a pixel i (or the ith pixel) can be summarised as:

$$\text{chroma keying flag}(i) = \begin{cases} 0, & \text{if value of pixel } i \ne \text{keying colour value;} \\ 1, & \text{if value of pixel } i = \text{keying colour value.} \end{cases}$$

It would of course be possible to alternatively set the chroma keying flags of pixels with values equal to the keying colour value to 0 and the chroma keying flags of pixels with values not equal to the keying colour value to 1 if desired. Other ways of storing the chroma keying information are of course possible, for example a bitmap may be generated and stored.

In the present example, a flag is set for each pixel of the foreground frame. This is however not essential. In other examples, if an area of the foreground frame is determined to include exclusively (multiple) pixels having the keying colour value (or not having the keying colour value), a single flag may be set for the area.

Figure 6:
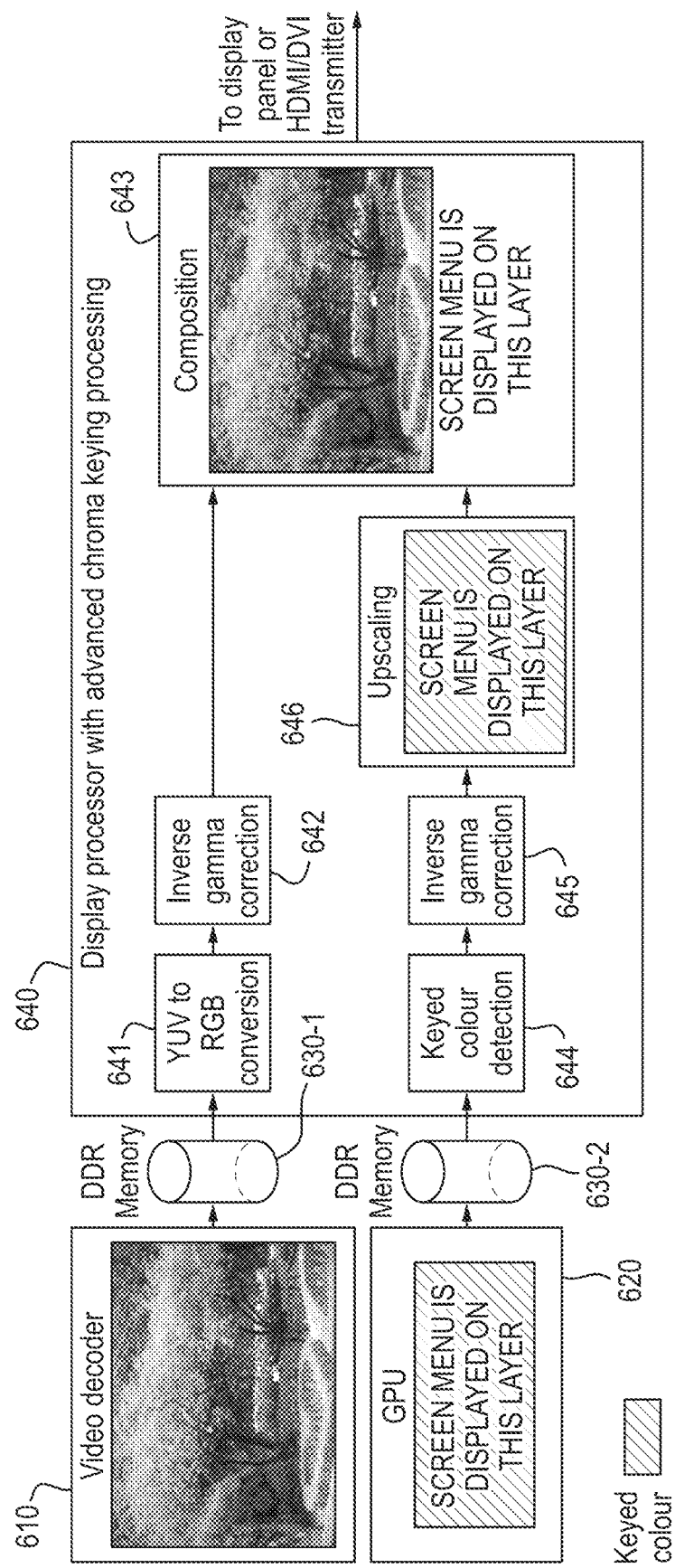
FIG. 6 shows an example of implementing the technique of FIG. 5 in a data processing system.

FIG. 6 shows an example of how the method of FIG. 5 may be applied. In the example, a data (image) processing system comprises a video encoder/decoder 610, a GPU 620, and a display processor 640. The data processing system is configured to communicate with off-chip memories 630-1, 630-2. The data processing system may further comprise other modules and devices, such as a CPU, as desired. The video encoder/decoder 610 outputs a background frame that is a video frame to off-chip memory 630-1. The GPU 620 generates a foreground frame, which comprises a line of subtitle that is the foreground object and keyed pixels, and outputs it to off-chip memory 630-2.

The background frame is read from the off-chip memory 630-1 by the display processor 640 and undergoes a number of image processing operations including colour conversion 641 and inverse Gamma correction 642 in the display processor 640 before being inputted to the composition engine 643.

The foreground frame, on the other hand, is read from the off-chip memory 630-2 by the display processor 640 and first undergoes keying colour detection 644, in which chroma keying information is generated to indicate one or more pixels in the foreground frame having the keying colour value, for example by setting a flag. The chroma keying information propagates with the foreground frame through a number of image processing operations including inverse Gamma correction 645 and upscaling 646, to composition with the background frame by the composition engine 643. At composition, the keyed pixels in the foreground frame are replaced, based on the chroma keying information, by pixels of the background frame, and the final composited frame is then outputted to a display device or the like.

Figure 7:
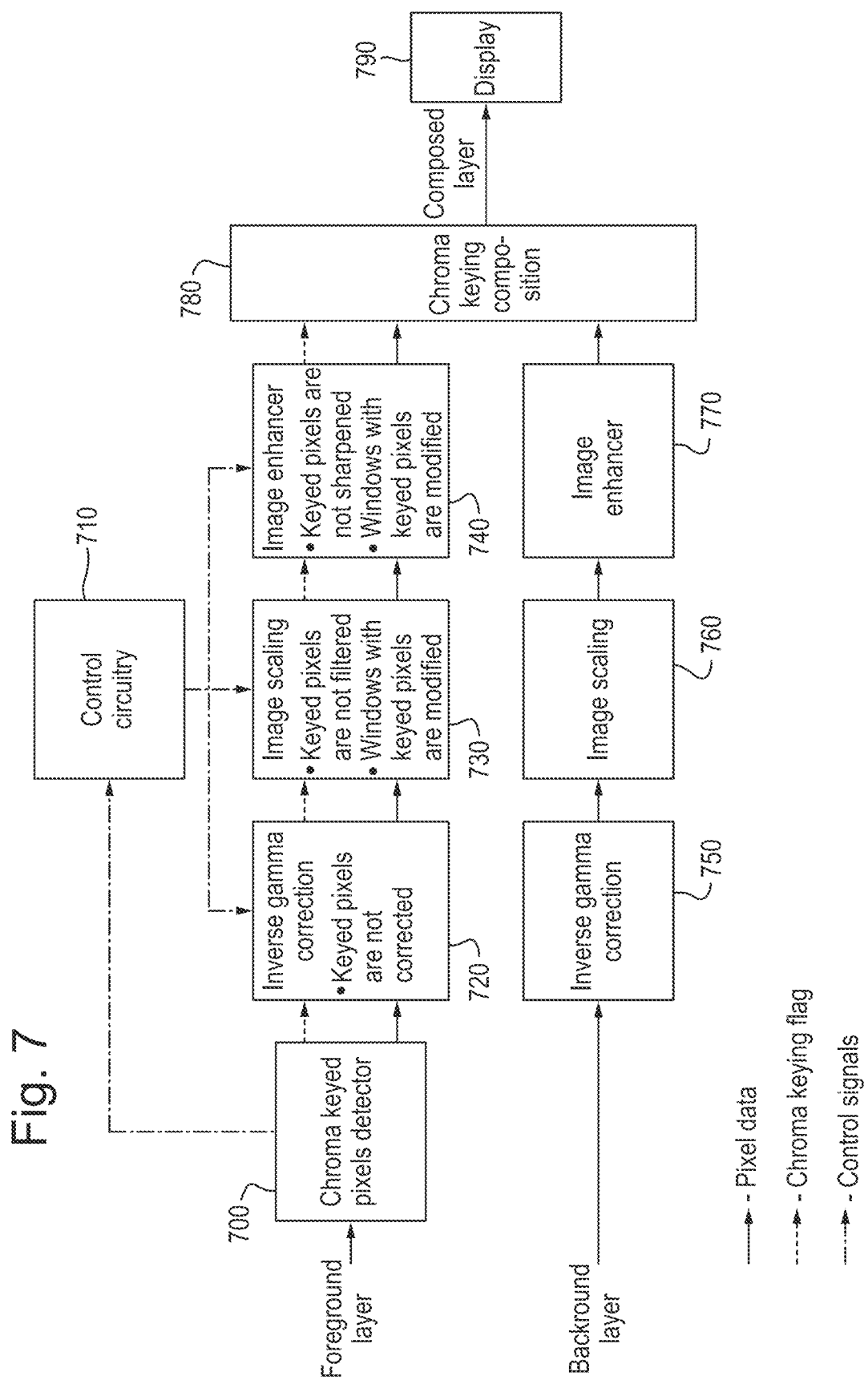
FIG. 7 schematically illustrates an example of an image processing pipeline according to an embodiment.

FIG. 7 schematically illustrates an example of a processing pipeline, in which a foreground frame and a background frame are processed and then composited.

The foreground frame, e.g. a video frame, graphics frame, text, etc., comprising foreground object pixels and keyed pixels, is first processed by a chroma keyed pixels detector 700 to generate chroma keying information on the foreground frame. In the example, the chroma keying information takes the form of one or more chroma keying flags which can be set, for example to 1, for a region (e.g. one or more pixels) of the foreground frame that is detected to have the chroma keying value (e.g. green).

The chroma keying information generated by the detector 700 is stored in memory (not shown) and propagates with the pixel data of the foreground frame along the processing pipeline, where the foreground frame is processed. In the example, the processing to be performed by one or more processing modules is controlled by control circuitry 710 using the stored chroma keying information. In the present example, the control circuitry 710 is shown as a separate module. However, in other examples, the control circuitry may be integrated into the detector 700 or other hardware elements, or provided to one or more of the processing modules of the processing pipeline.

After detection, the foreground frame is processed by an inverse Gamma correction module 720. Since the chroma keying information is already available, it is possible to determine which region or regions of the foreground frame is/are keyed pixel(s). Thus, the control circuitry 710 causes the inverse Gamma correction module 720 to omit processing the keyed pixel(s) and only pixel data of the foreground object pixels are corrected.

The inverse Gamma corrected pixel data is transmitted to an image scaling module 730 which filters the pixel data using a scaling filter. The chroma keying information is again used by the control circuitry 710 to control the image scaling module 730. The image scaling module 730 applies the scaling filter to the pixel data of the foreground object pixels, while regions determined to be keyed pixels based on the chroma keying information are not filtered. In a case where a filter window is used, if the filter window covers an area of the foreground frame including both foreground object pixels and keyed pixels, the filter window input is modified in such a way that the values of the keyed pixels do not affect the output value of a foreground object pixel to which the filter window is applied. Details of how the filter window input is modified will be described in more detail below. In order to ensure correct correspondence between the chroma keying information and the scaled pixel data, it may be possible to modify the chroma keying information according to the scaling factor (ratio) applied to the pixel data.

The scaled pixel data is transmitted to an image enhancer module 740 along with the chroma keying information. The control circuitry 710 causes the image enhancer module 740 to apply a sharpening filter to the pixel data of the foreground object pixels and omit regions that are determined to be keyed pixels. Again, where a filter window is applied to a foreground object pixel and the filter window covers an area including both foreground object pixels and keyed pixels, the filter window input is modified in such a way that the values of the keyed pixels do not affect the output value of the foreground object pixel to which the filter window is applied.

The background frame is similarly processed by an inverse Gamma correction module 750, then an image scaling module 760, and finally an image enhancer module 770. It should be noted that the background frame may be processed by one or more of the same or different modules as the foreground frame. Moreover, it is not essential that the foreground frame and the background frame undergo the same one or more processing operations.

The processed pixel data and the chroma keying information of the foreground frame are transmitted to a composition module 780. Similarly, the processed pixel data of the background frame is transmitted to the composition module 780. Then, the composition module 780 composites the foreground frame with the background frame by replacing the keyed pixels in the foreground frame with pixels of the background frames, in accordance with the chroma keying information. The composited frame is then outputted for use, e.g. to be displayed by a display device 790.

Figure 8:
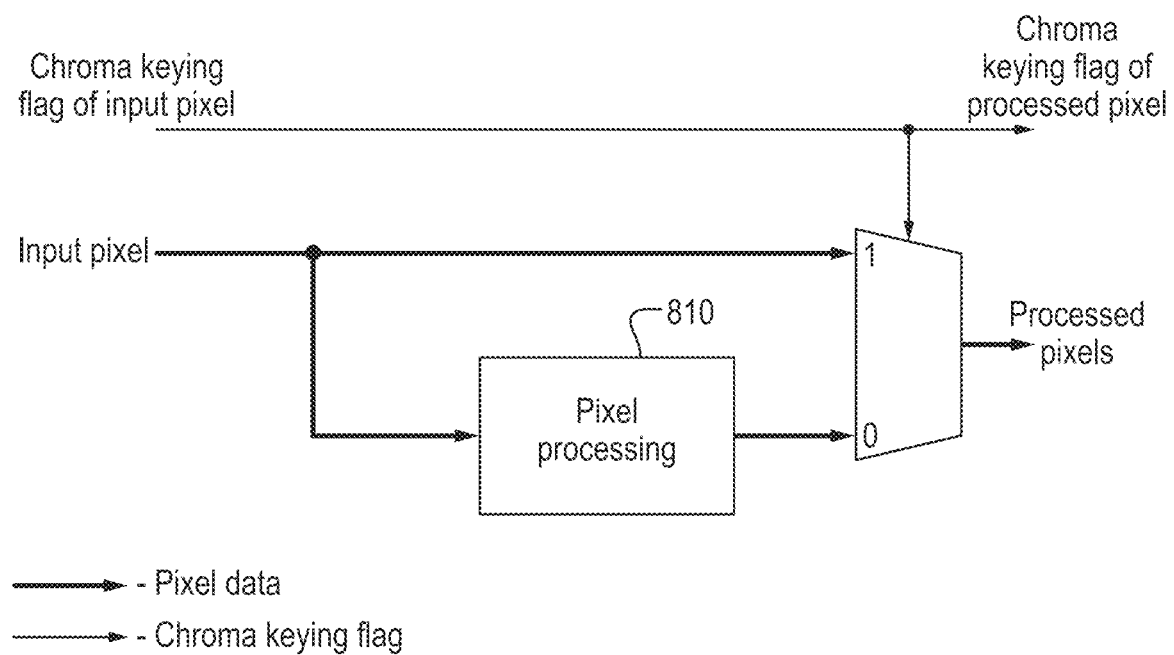
FIG. 8 schematically illustrates an exemplary method of modifying a processing operation that operates independently on a pixel according to an embodiment.

FIG. 8 illustrates an embodiment in which the processing to be applied to a pixel of the foreground frame operates independently on the pixel, e.g. inverse Gamma correction. Chroma keying information is generated during keyed pixel detection and the chroma keying information propagates with the pixel data of the foreground frame through the processing. The pixel data of the foreground object pixels is processed by a pixel processing module 810, while, using the chroma keying information, one or more keyed pixels are identified from the foreground frame and the processing is not performed for the keyed pixels. The processed pixel data of the foreground frame is outputted for use along with the chroma keying information.

According to the present embodiment, processing that is to be performed on keyed pixels is omitted (bypassed or not performed) and only foreground object pixels are processed. It is therefore possible to reduce unnecessary consumption of power and bandwidth result from processing keyed pixels which are intended to be replaced by background pixels.

Figure 9:
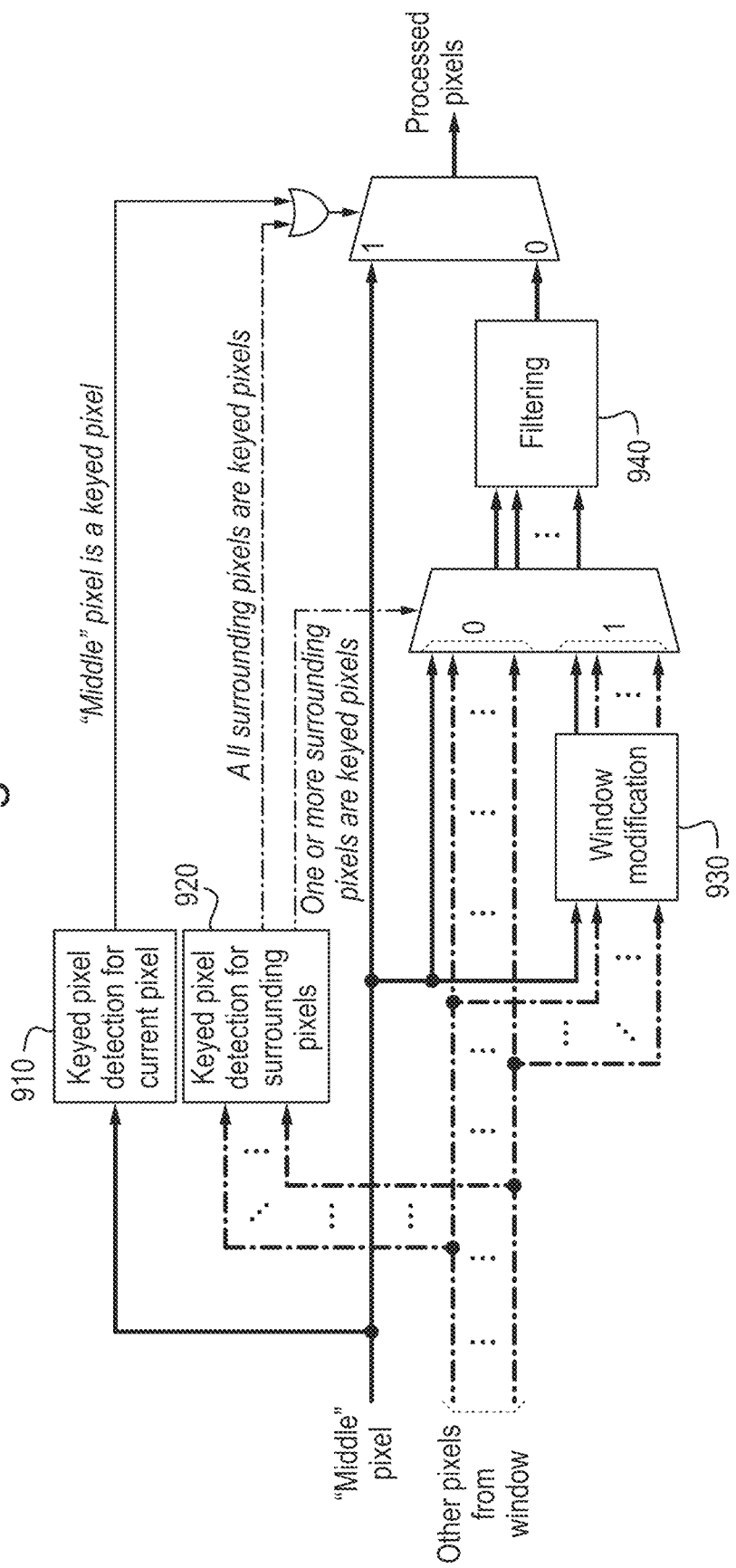
FIG. 9 schematically illustrates an exemplary method of modifying a processing operation that operates on a group of pixels according to an embodiment.

FIG. 9 illustrates an embodiment in which the processing to be applied to a pixel of the foreground frame operates on a group of pixels, e.g. a window operation such as a sharpening filter or a scaling filter that operates on a group of pixels including the pixel and plural surrounding pixels to output a value for the pixel. Chroma keying information of the foreground frame propagates through the processing along with the pixel data.

In the processing operation, a filter window is applied to a current pixel ("middle" pixel), and the filter window covers an area that includes the current pixel and one or more surrounding pixels. A detection module 910 checks whether the current pixel is a keyed pixel using the chroma keying information of the foreground frame. If it is determined that the current pixel is a keyed pixel, filtering is not performed and the current pixel is outputted without being processed. Since keyed pixels are to be replaced by background pixels, processing of keyed pixels is unnecessary and therefore can be omitted.

If the current pixel is instead determined to be a foreground object pixel, a detection module 920 checks, using the chroma keying information, whether the surrounding pixels covered by the filter window includes one or more keyed pixels. If it is determined that all of the surrounding pixels are keyed pixels, filtering is not performed and the current pixel is outputted without being processed. Since the filter window requires input from the surrounding pixels, if all of the surrounding pixels are keyed pixels, using the values of the surrounding pixels as input would introduce errors/distortions to the output value of the current pixel, and processing of the current pixel in this case is therefore omitted.

If the current pixel is a foreground object pixel and the surrounding pixels include both keyed pixels and foreground object pixels, the filter window inputs are modified by window modification module 930 in accordance with predetermined modification rules. The current pixel is then processed using the modified filter window 940 and the processed pixel data along with the chroma keying information of the processed foreground frame are outputted for use. The modification rules modify the filter window inputs in such a way that values of the keyed pixels present in the group of surrounding pixels do not influence the output value of the current pixel.

According to the present embodiment, when the current pixel to be processed is a keyed pixel, or when the current pixel to be processed is a foreground object pixel but all other pixels covered by the filter window are keyed pixels, processing is omitted, and therefore unnecessary consumption of bandwidth and power is reduced. Moreover, by omitting the processing to be performed on a current pixel which is surrounded only by keyed pixels, or modifying the filter window when the surrounding pixels include both keyed pixels and foreground object pixels, it is possible to reduce, in some cases even prevent, introducing distortions in the output pixels. In embodiments, distortions caused by using the values of keyed pixels in a filtering operation may be reduced and post-processing distortion detection and correction may be reduced.

The predetermined modification rules may be set according to the type of filter used in the processing operation, or in any suitable or desirable manner. Some examples will now be described.

Figure 10:
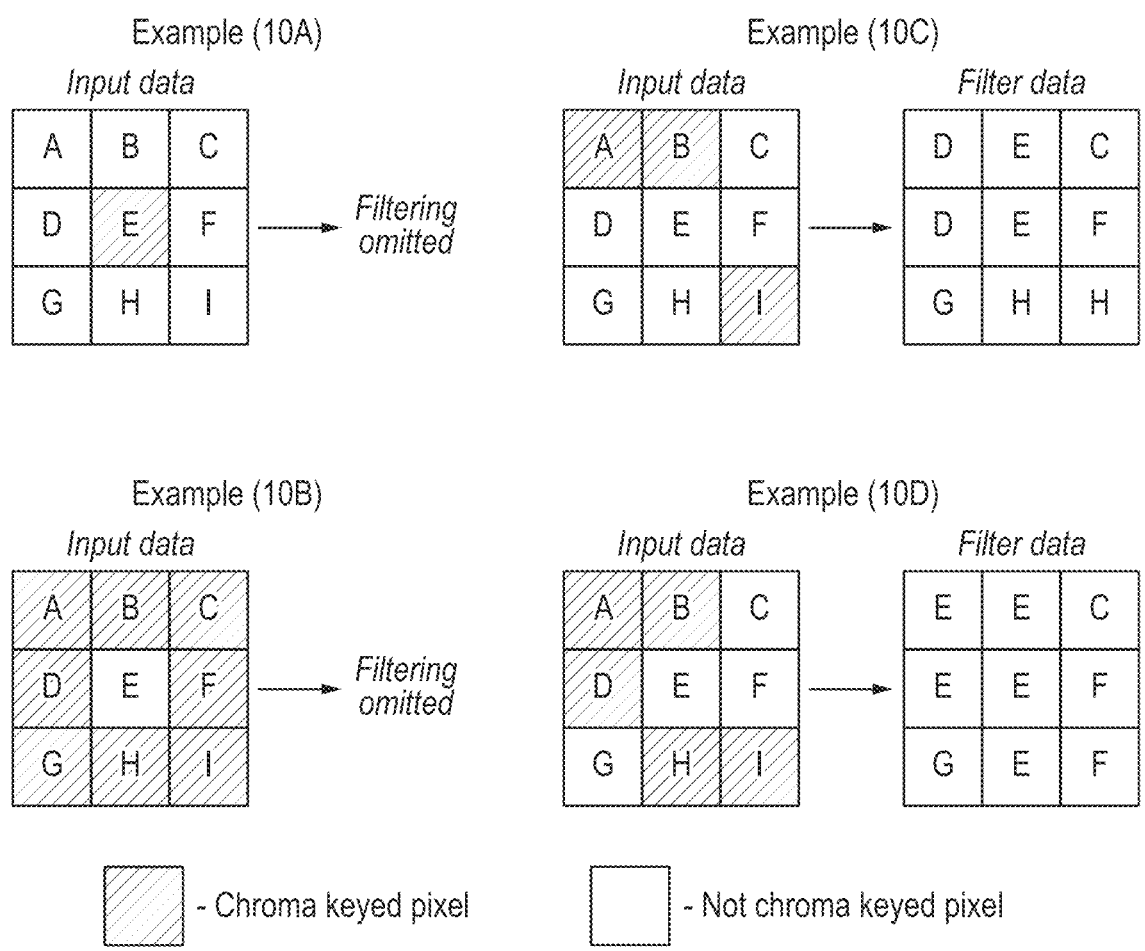
FIG. 10 shows examples of modifying a filter window according to the exemplary method of FIG. 9.

An example of modifying a filter window according to embodiments of the technology described herein is shown in FIG. 10, in which the filter window is a 3×3 sharpening filter window. In the example, grey squares represent keyed pixels while white squares represent foreground object pixels. In a square window with odd number of pixels, the pixel to be processed (current pixel) is the pixel in the middle of the window. In this example, it is the pixel at the second row of the second column.

In Example 10A, pixel E which is the current pixel to be processed is a keyed pixel. In this case, filtering is omitted and the pixel data of pixel E is outputted without filtering. It should be noted that, although in this example, the surrounding pixels A, B, C, D, F, G, H and I are all foreground object pixels, the omission of the filtering is determined by the current pixel E being a keyed pixel, thus filtering is also omitted even if the surrounding pixels are all keyed pixels or a combination of keyed pixels and foreground object pixels.

In Example 10B, the current pixel E is a foreground object pixel, while all of the surrounding pixels A, B, C, D, F, G, H and I are keyed pixels. In this case, filtering is again omitted.

In Example 10C, the current pixel E is a foreground object pixel, while the surrounding pixels A, B, C, D, F, G, H and I are a combination of keyed pixels and foreground object pixels. In this case, it is determined that the filter is to be modified. In the present example, values to be inputted to the filter that correspond to values of the keyed pixels are replaced by values of the foreground object pixels.

According to the embodiments, a keyed pixel of the filter input is replaced by an adjoining pixel. In an embodiment, the input value corresponding to a keyed pixel is replaced by the value of the current pixel at the middle of the filter window. For example, the filter input of pixel B is replaced by the filter input (value) of pixel E. If a keyed pixel to be replaced does not adjoin the current pixel, the keyed pixel to be replaced is in an embodiment replaced by an adjoining pixel in the same row. For example, the filter input of pixel I is replaced by the filter input (value) of pixel H. If the adjoining pixel in the same row as the keyed pixel to be replaced is also a keyed pixel, the value of the keyed pixel to be replaced is replaced by the value of an adjoining pixel in the same column. For example, the filter input of pixel A is replaced by the filter input (value) of pixel D.

In Example 10D, keyed pixels B, D and H all adjoin the current pixel E, and so the filter inputs of pixels B, D and H are replaced by the filter input (value) of pixel E. The adjoining pixel that is in the same row as keyed pixel I is also a keyed pixel, and so the filter input of pixel I is replaced by the filter input (value) of pixel F which is a foreground object pixel in the same column as pixel I. Both of the pixels adjoining pixel A are also keyed pixels, in this case, the filter input of pixel A is replaced by the (replaced) filter input of pixel B, which is the filter input (value) of pixel E.

Figure 11:
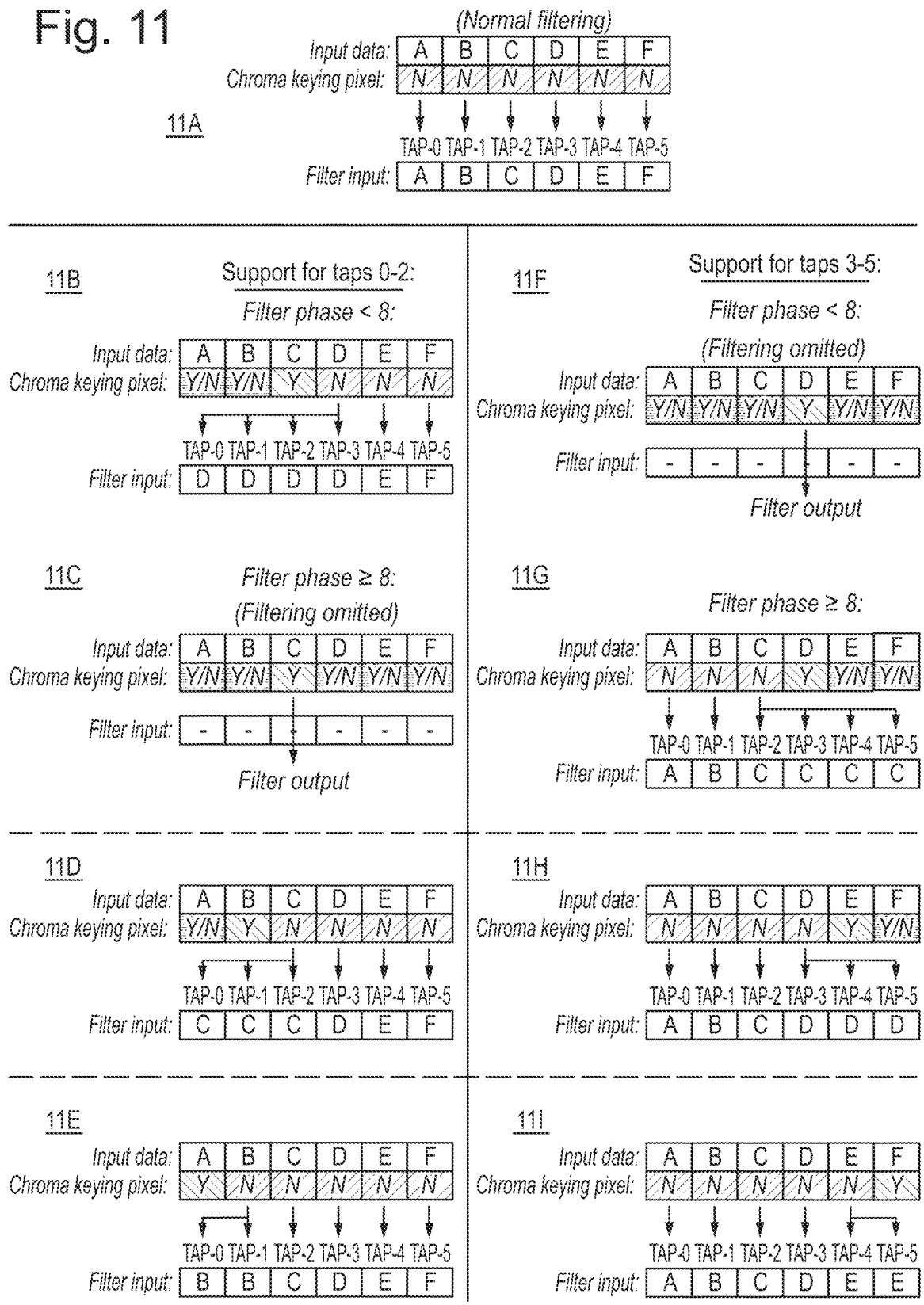
FIG. 11 shows further examples of modifying a filter window according to the exemplary method of FIG. 9.

Another example of modifying a filter window according to embodiments of the technology described herein is shown in FIG. 11, in which the filter window is a polyphase image scaling filter window.

Polyphase filtering scaling algorithms are commonly used for high-quality image scaling operations. In general, polyphase filtering scaling methods perform polyphase filtering in both the horizontal and vertical directions. Polyphase filtering is based on FIR filters where impulse responses are divided into phases, and so different sets of coefficients may be used to compute the filtering results of different pixels. Which set of coefficients is used depends on the current phase of the filter. The implementation of polyphase scaling in the present embodiments can be done in any suitable and desired (and known) manner, and so a detailed description of this will not be given.

Such filtering in two dimensions can be decomposed into two orthogonal, one-dimensional operations. To simplify the description of the embodiments, the exemplary polyphase scaling filters are in the form of one-dimensional filters. In this case, the phase of the exemplary polyphase scaling filter can be determined using the equation:

$$\text{phase}(n) = \text{floor}\left(\text{mod}\left(\text{initial\_phase} + n \cdot \frac{\text{size\_in}}{\text{size\_out}} \cdot NP + \frac{NP}{2}, NP\right)\right)$$

where phase(n) is the phase of the filter for the n-th output pixel, initial_phase is the initial phase offset (this parameter may be omitted in some applications, and in this case, the value of NP/2 may be used instead), size_in is the size of the input frame, size_out is the size of the output frame, NP is the total number of phases, floor(x) is a function that, here, rounds a value x to the nearest integer towards 0, mod(a,b) is the modulus of a divided by b.

The present exemplary polyphase image scaling filter uses a 6-tap, 16-phase filter implementation. Then, the pixel outputted by the filter (current pixel) may either be the output at tap-2 or tap-3 of the filter (as both are at the middle of the filter). In this case, the current or middle pixel is considered to be the pixel in the filtering window at a position in the input frame that is closest to the position at which the current output is located in the output frame. For 6-tap, 16-phase scaling filters, the middle pixel is the pixel at tap-2 of the filter if the current phase of the filter is greater than or equal to 8 (phase(n)≥8), and if the current phase of the filter is less than 8 (phase(n)<8), the pixel at tap-3 of the filter is considered the middle pixel.

In the present embodiment, if the current or middle pixel of the group of input pixels covered by the filter window is a foreground object pixel, and all remaining pixels of the group are also foreground object pixels, as in Example 11A, filtering is performed as normal and the filter input value for each tap simply corresponds to the value of the pixel at that tap.

If the current pixel is a keyed pixel, filtering is omitted. For example, where the phase of the filter is greater than or equal to 8, the current pixel is the pixel at tap-2. Thus, as shown in Example 11C, if the pixel at tap-2 is a keyed pixel, filtering is omitted. Where the phase of the filter is less than 8, the current pixel is the pixel at tap-3. Thus, as shown in Example 11F, if the pixel at tap-3 is a keyed pixel, filtering is omitted.

If the current pixel is a foreground object pixel, the filter is modified according to a set of replacement rules. A detection is performed on the pixels other than the current pixel in the group of pixels covered by the filter window to detect a keyed pixel located closest to the current pixel. Then, the keyed pixel and all other pixels beyond the keyed pixel (away from the current pixel) are replaced by the foreground object pixel adjoining the keyed pixel that is located between the keyed pixel and the current pixel.

For example, in Example 11B, where the phase of the filter is less than 8, the current pixel at tap-3 is a foreground object pixel, filtering is performed with a modified filter. In particular, pixel C at tap-2 is a keyed pixel and so the filter inputs for tap-0 to tap-2 (the keyed pixel and beyond) are replaced by the filter input of tap-3 which is pixel D.

In Example 11G, where the phase of the filter is greater than or equal to 8, the current pixel at tap-2 is a foreground object pixel, filtering is performed with a modified filter. In particular, pixel D at tap-3 is a keyed pixel and so the filter inputs for tap-3 to tap-5 (the keyed pixel and beyond) are replaced by the filter input of tap-2 which is pixel C.

Further examples 11D, 11E, 11H and 11J are shown in which both tap-2 and tap-3 are foreground object pixels and at least one tab is a keyed pixel. In Example 11D, pixel B at tap-1 is a keyed pixel and so the filter inputs for tap-0 and tap-1 are replaced with the filter input for tap-2. In Example 11H, pixel E at tap-4 is a keyed pixel and so the filter inputs for tap-4 and tap-5 are replaced with the filter input for tap-3. In Example 11E, tap-0 is a keyed pixel and its filter input is replaced by the filter input of tap-1, while in Example 11J, tap-5 is a keyed pixel and its filter input is replaced by the filter input of tap-4.

In the present embodiment, the same method of modifying a one-dimensional polyphase scaling filter in one direction is used for the other direction, and so the description will not be repeated.

According to embodiments, by modifying the filter so that the filter input from a keyed pixel is replaced by the filter input of an adjoining foreground object pixel, it is possible to reduce distortions caused by keyed pixels "bleeding" into a foreground object.

Figure 12:
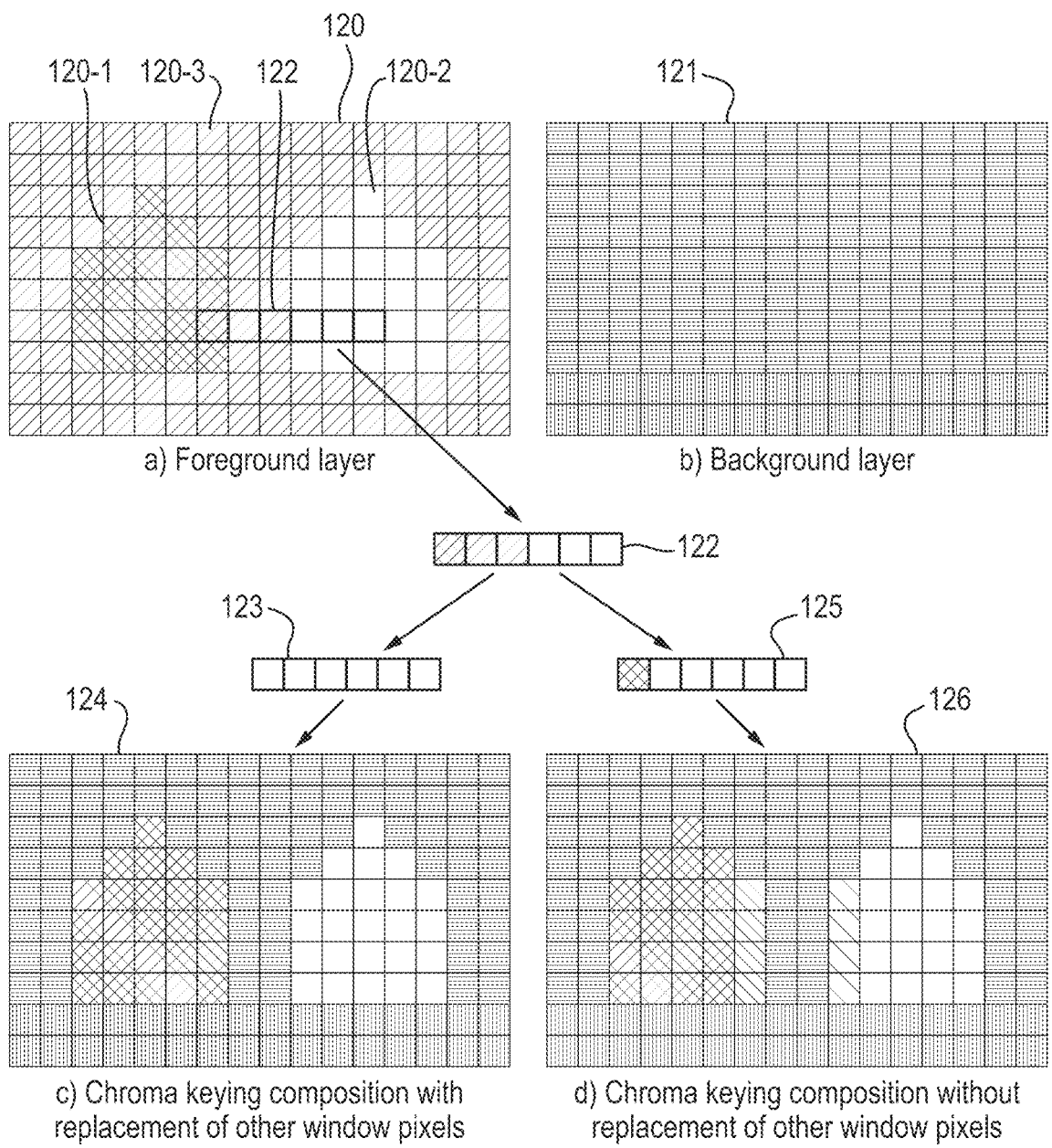
FIG. 12 illustrates the effect of the exemplary method of FIG. 9.

For example, as shown in FIG. 12, a foreground frame 120 is to be processed, e.g. by filtering with a polyphase filter, and then composited with a background frame 121. At some point, the filter window is applied to an area 122 which includes a combination of pixels from foreground object 120-1 and foreground object 120-2 and keyed pixels 120-3.

If an unmodified filter window 125 is applied to the area 122, and unmodified filter windows are applied also to other areas that include a combination of foreground object pixels and keyed pixels, the composite frame 126 results which is distorted at the boundaries between the foreground objects 120-1 and 120-2 and the keyed pixels 120-3.

On the other hand, according to the embodiments, assuming that tap-3 (the fourth tab from the left) is the current (or middle) pixel, since tap-2 is a keyed pixel, the filter inputs for tap-0 to tap-2 are replaced by the filter input for tap-3, as shown by filter window 123. As a result of the modification, the composite frame 124 is free of distortion.

In the examples above, the chroma keying information of a foreground frame is used to modify a processing operation as the foreground frame is being processed, but propagates through the processing operation without any alterations. However, in some embodiments, it may be possible to modify the chroma keying information in correspondence with the processed foreground frame.

Figure 13:
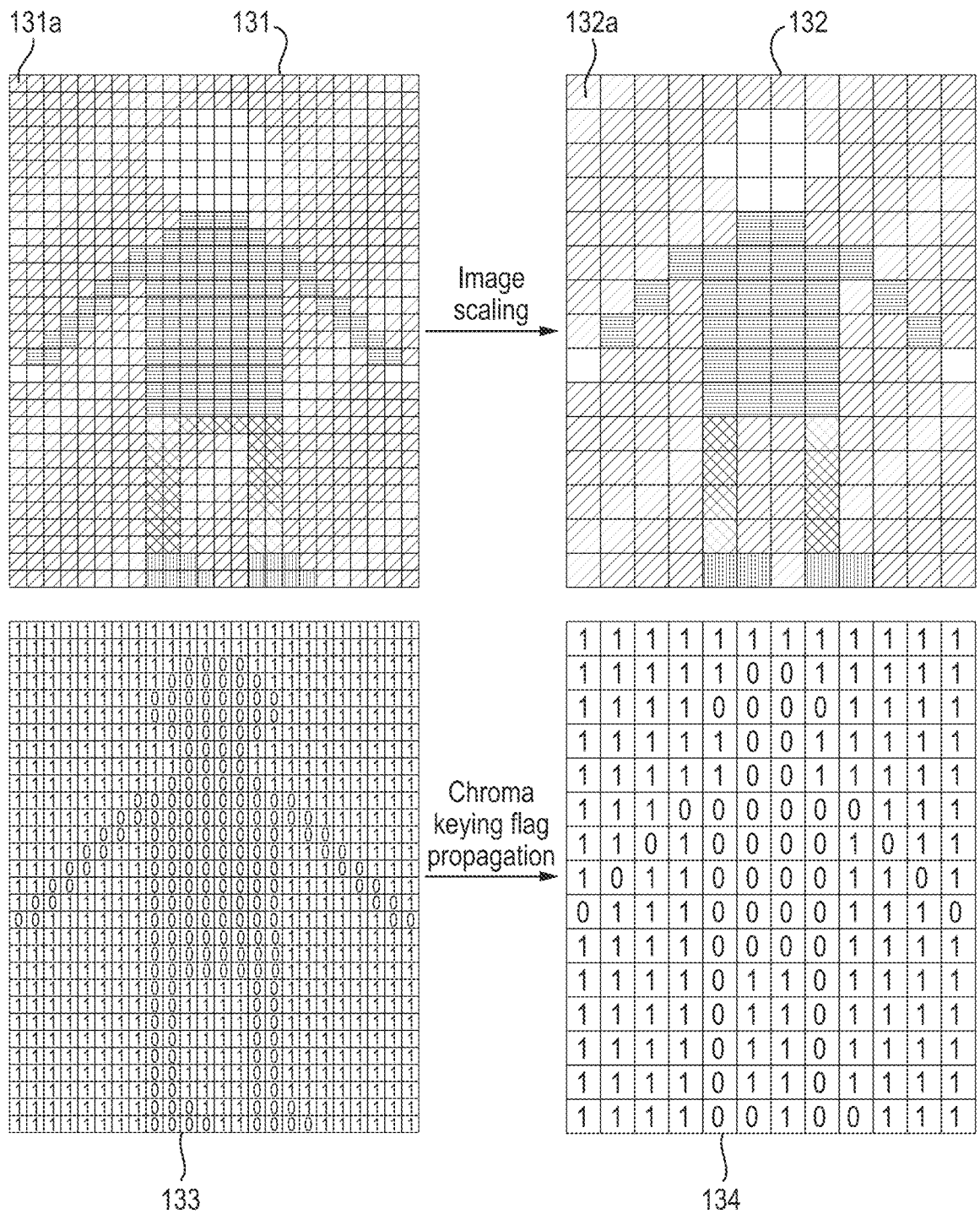
FIG. 13 schematically illustrates an exemplary method of modifying chroma keying information corresponding to a frame according to an embodiment.

For example, as depicted in FIG. 13, in a case where the chroma keying information of a foreground frame 131 is stored in the form of an array of chroma keying flags 133, each flag corresponding to a pixel (or sampling point) of the foreground frame 131 as described above, if the processing operation results in a change of image resolution in the processed foreground frame 132, the number of pixels in the foreground frame before the processing operation may be different from the number of pixels in the processed foreground frame. In this case, the chroma keying information is in an embodiment modified such that each flag maintains its correspondence with each pixel of the processed foreground frame.

In an embodiment, where a foreground frame is scaled, the chroma keying information of the foreground frame is scaled according to a ratio corresponding to the scaling ratio applied to the foreground frame. For example, the chroma keying flag for the n-th sampling point can be determined using the equation:

$$\text{out\_chroma\_keying\_flag}(n) = \text{in\_chroma\_keying\_flag}\left(\text{floor}\left(n \cdot \frac{\text{size\_in}}{\text{size\_out}} + 0.5\right)\right)$$

where out_chroma_keying_flag (n) is the value of the chroma keying flag for the n-th sampling point of the output foreground frame, in_chroma_keying_flag(n) is the value of the chroma keying flag for the n-th sampling point of the input foreground frame, size_in is the size of the input foreground frame, size_out is the size of the output foreground frame, and floor(x) is a function that, here, rounds a number x to the nearest integer towards 0.

The equation above for determining the value of a chroma keying flag in a case where the foreground frame is scaled is illustrated in FIG. 14A and FIG. 14B, which respectively show a case of up-scaling and a case of down-scaling. The chroma keying flag of a pixel of the scaled frame takes the value of the chroma keying flag of a pixel of the original frame that is at the nearest corresponding location in the original frame with respect to the location of the pixel in the scaled frame, e.g. pixel 131a and pixel 132a of FIG. 13, where the location correspondence between the scaled frame and the original frame is determined by the right hand side of the above equation. Thus, as shown in FIG. 13, the array of chroma keying flags 133 that is the chroma keying information for the original foreground frame 131 is transformed, by the equation, into an array of chroma keying flags 134 that is the chroma keying information for the scaled foreground frame 132.

In the embodiment, the foreground frame may be scaled by any suitable or desirable scaling methods, but the chroma keying information may be modified in the same manner based on the scaling ratio applied to the foreground frame irrespective of the scaling method used.

According to the exemplary method of modifying the chroma keying information of a foreground frame, chroma keying information is modified when the foreground frame is upscaled and/or downscaled. In an embodiment, the chroma keying information is modified based on the scaling ratio applied to the foreground frame according to a predetermined rule such as the equation above. The modification in an embodiment maintain the correspondence between the chroma keying information and each pixel of the scaled foreground frame.

According to the embodiments described herein, chroma keying detection is performed on a region of a foreground frame prior to processing the region to obtain chroma keying information for the region. The chroma keying information in an embodiment indicates whether the region has the keying colour value. Based on the chroma keying information, subsequent processing to be performed on the region may be modified.

In embodiments, if the chroma keying information indicates that the region has the keying colour value, the processing to be performed on the region may be omitted. In this case, the overall power consumption of the data processing system may be reduced. In some embodiments, where the processing result of the region is dependent on the data values of the surrounding (neighbouring) regions, the processing to be performed on the region may be modified based on the chroma keying information of the surrounding regions. In an implementation example, where the processing to be performed on the region is to apply an image filter to the region, the filter input may be modified based on the chroma keying information of the region and the surrounding regions that are covered by the image filter.

By modifying the processing to be performed on the region based on the chroma keying information, it is possible to reduce the likelihood of generating distortions (or artifacts) when compositing the foreground frame with the background frame. Thus, detection and correction of distortions in the composite frame may in some cases be avoided.

In embodiments, the chroma keying information of the foreground frame propagates through the processing with the foreground frame, such that the chroma keying information may be used in subsequent processing where desirable, and during composition of the foreground frame with a background frame for identifying keyed pixels in the foreground frame that are to be replaced with pixels of the background frame.

As will be appreciated from the above, embodiments of the technology described herein are capable of providing a mechanism for modifying an image processing operation to be performed on a foreground frame that is to be composited with a background frame, e.g. to provide it for display. Moreover, embodiments of the technology described herein may comprise a mechanism for reducing the amount of processing required in a data (image) processing system when processing a foreground frame compared to known, conventional processing techniques. It is therefore possible to reduce the amount of distortion e.g. when compositing the foreground frame with the background frame, and to reduce power consumption e.g. when processing the content of the foreground frame.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of providing a foreground frame to be composited with a background frame, the foreground frame comprising a plurality of regions, the foreground frame comprising a first array of data positions, the method comprising:
   before compositing the foreground frame with the background frame:
   determining by processing circuitry, for plural regions of the foreground frame, if the region has a predetermined color value; and
   generating and storing by the processing circuitry binary chroma keying information for the foreground frame based on the determination to thereby provide chroma keying information for the foreground frame, wherein the binary chroma keying information for the foreground frame comprises a second array of binary chroma keying information separate to the foreground frame comprising plural binary flags, each binary flag corresponding to a region of the foreground frame and having a binary value indicating whether the corresponding region has the predetermined color value;
   the method further comprising:
   performing a filtering operation that changes the resolution of the foreground frame according to a scaling ratio to generate a processed foreground frame; and
   controlling by processing circuitry the filtering operation that changes the resolution of the foreground frame according to a scaling ratio to be performed on a region of the foreground frame according to the stored second array of binary chroma keying information;
   wherein the controlling the filtering operation to be performed on the region of the foreground frame according to the stored second array of binary chroma keying information comprises:
   performing the filtering operation that changes the resolution of the foreground frame according to a scaling ratio to determine pixel values for the region of the foreground frame when the binary chroma keying information for the region indicates that the region does not have the predetermined color value to generate a third array comprising a scaled version of the data positions for the foreground frame; and
   not performing any filtering for the region of the foreground frame when the binary chroma keying information for the region indicates that the region has the predetermined color value, so that the region retains the predetermined color value; and
   the method further comprises:
   scaling the second array of binary chroma keying information for the foreground frame based on the scaling ratio applied to the foreground frame, to generate a fourth array comprising a scaled version of the binary foreground frame chroma keying information for the third array comprising a scaled version of the data positions for the foreground frame, wherein the fourth array comprising a scaled version of the binary foreground frame chroma keying information comprises an array of plural binary flags, each binary flag corresponding to a region of the third array comprising a scaled version of the data positions for the foreground frame and having a binary value indicating whether the corresponding region of the third array comprising a scaled version of the data positions for the foreground frame has the predetermined color value; and
   storing the fourth array comprising a scaled version of the binary foreground frame chroma keying information for use with the third array comprising a scaled version of the data positions for the foreground frame.

2. The method of claim 1, wherein the filtering operation to be performed comprises filtering by applying a filter window to the region, the filter window covering an area of the foreground frame comprising the region and one or more surrounding regions, and controlling the filtering operation comprises not performing the filtering if the binary chroma keying information indicates that all of the one or more surrounding regions has/have the predetermined colour value.

3. The method of claim 2 wherein the filter window is a polyphase scaling filter having NP phases and NT taps, the filter window covering an area of the foreground frame comprising an even number of regions, and the filter window is applied such that the region is located at the $(NT/2)^{th}$ tap when the phase of the polyphase scaling filter is greater than or equal to $(NP/2)$, and the region is located at the $((NT/2)+1)^{th}$ tap when the phase of the polyphase scaling filter is less than $(NP/2)$.

4. The method of claim 1, wherein the filtering operation to be performed comprises filtering by applying a filter window to the region, the filter window covering an area of the foreground frame comprising the region and one or more surrounding regions, and controlling the filtering operation comprises modifying the inputs to the filter window based on the binary chroma keying information of the one or more surrounding regions if the binary chroma keying information indicates that the region does not have the predetermined colour value.

5. The method of claim 4 wherein modifying the inputs to the filter window comprises replacing the value of a region amongst the one or more surrounding regions that has the predetermined colour value by the value of the region or by the value of a region amongst the one or more surrounding regions that does not have the predetermined colour value.

6. The method of claim 1 further comprising compositing by processing circuitry the foreground frame with a background frame by replacing one or more regions of the foreground frame that the binary chroma keying information indicates has/have the predetermined colour values with one or more regions of the background frame.

7. The method of claim 1, wherein each frame region is a pixel of the frame.

8. An apparatus for providing a foreground frame to be composited with a background frame, the foreground frame comprising a plurality of regions that together form the foreground frame, the foreground frame comprising a first array of data positions, the apparatus comprising:
   processing circuitry that is operable to determine, before the foreground frame is composited with the background frame and for plural regions of the foreground frame, whether the region of the foreground frame has a predetermined color value, and
   generate and store binary chroma keying information based on the determination to thereby provide chroma keyin information for the foreground frame, wherein the binary chroma keying information comprises a second array of binary chroma keying information separate to the foreground frame comprising plural binary flags, each binary flag corresponding to a region of the foreground frame and having a binary value indicating whether the corresponding region has the predetermined color value;
   the processing circuitry further operable to:
   perform filtering operation that changes the resolution of the foreground frame according to a scaling ratio to generate a processed foreground frame; and
   control processing circuitry operable to control the filtering operation that changes the resolution of the foreground frame according to a scaling ratio to be performed on a region of the foreground frame according to the stored second array of binary chroma keying information, wherein the control processing circuitry is operable to control image processing according to the stored second array of binary chroma keying information before the foreground frame is composited with the background frame by:
   performing the filtering operation that changes the resolution of the foreground frame according to a scaling ratio to determine pixel values for the region of the foreground frame when the binary chroma keying information for the region indicates that the region does not have the predetermined color value; and
   not performing any filtering for the region of the foreground frame when the binary chroma keying information for the region indicates that the region has the predetermined color value, so that the region retains the predetermined color value; and
   scaling circuitry operable to:
   scale the first array of data positions for the foreground frame based on a scaling ratio to be applied to the foreground image for an image processing operation that changes the resolution of the foreground frame for an image processing operation according to a scaling ratio to generate a third array comprising a scaled version of the data positions for the foreground frame;
   scale the second array of binary chroma keying information for the foreground frame based on the scaling ratio to be applied to the foreground frame for the image processing operation that changes the resolution of the foreground frame according to a scaling ratio, to generate a fourth array comprising a scaled version of the binary foreground frame chroma keying information for the processed foreground frame, wherein the fourth array of the scaled version of the binary foreground frame chroma keying information comprises an array of plural binary flags, each binary flag corresponding to a region of the third array comprising a scaled version of the data positions for the foreground frame and having a binary value indicating whether the corresponding region of the third array comprising a scaled version of the data positions for the foreground frame has the predetermined color value, and to store the fourth array comprising a scaled version of the binary foreground frame chroma keying information for use with the third array comprising a scaled version of the data positions for the foreground frame.

9. The apparatus of claim 8, wherein the filtering operation to be performed comprises filtering by applying a filter window to the region, the filter window covering an area of the foreground frame comprising the region and one or more surrounding regions, and the control processing circuitry is operable to control the filtering operation by not performing the filtering if the binary chroma keying information indicates that all of the one or more surrounding regions has/have the predetermined colour value.

10. The apparatus of claim 9 wherein the filter window is a polyphase scaling filter having NP phases and NT taps, the filter window covering an area of the foreground frame comprising an even number of regions, and the filter window is applied such that the region is located at the $(NT/2)^{th}$ tap when the phase of the polyphase scaling filter is greater than or equal to $(NP/2)$, and the region is located at the $((NT/2)+1)^{th}$ tap when the phase of the polyphase scaling filter is less than $(NP/2)$.

11. The apparatus of claim 8 wherein the fitlering operation to be performed comprises filtering by applying a filter window to the region, the filter window covering an area of the foreground frame comprising the region and one or more surrounding regions, and the control processing circuitry is operable to control the filtering operation by modifying the inputs to the filter window based on the binary chroma keying information of the one or more surrounding regions if the binary chroma keying information indicates that the region does not have the predetermined colour value.

12. The apparatus of claim 8, wherein the apparatus further comprises processing circuitry operable to composite the foreground frame with a background frame by replacing one or more regions of the foreground frame that the binary chroma keying information indicates has/have the predetermined colour values with one or more regions of the background frame.

13. The apparatus of claim 8, wherein each frame region is a pixel of the frame.

14. A non-transitory computer readable storage medium storing computer software code which when executing on at least one processor performs a method of providing a foreground frame to be composited with a background frame, the foreground frame comprising one or more regions and comprising a first array of data positions, the method comprising:
   before compositing the foreground frame with the background frame:
   determining by processing circuitry, for plural regions of the foreground frame, if the region has a predetermined color value; and generating and storing by the processing circuitry binary chroma keying information based on the determination to thereby provide chroma keying information for the foreground frame, wherein the binary chroma keying information for the foreground frame comprises a second array of binary chroma keying information separate to the foreground frame comprising plural binary flags, each binary flag corresponding to a region of the foreground frame and having a binary value indicating whether the corresponding region has the predetermined color value;

the method further comprising:

performing a filtering operation that changes the resolution of the foreground frame according to a scaling ratio to generate a processed foreground frame; and controlling by processing circuitry the in operation that changes the resolution of the foreground frame according to a scaling ratio to be performed on a region of the foreground frame according to the stored second array of binary chroma keying information;

wherein the controlling the filtering operation to be performed on the region of the foreground frame according to the stored second array of binary chroma keying information comprises:

performing the filtering operation that changes the resolution of the foreground frame according to a scaling ratio to determine pixel values for the region of the foreground frame when the binary chroma keying information for the region indicates that the region does not have the predetermined color value to generate a third array comprising a scaled version of the data positions for the foreground frame; and not performing any filtering for the region of the foreground frame when the binary chroma keying information for the region indicates that the region has the predetermined color value, so that the region retains the predetermined color value; and the method further comprises:

scaling the second array of binary chroma keying information for the foreground frame based on the scaling ratio applied to the foreground frame to generate a fourth array comprising a scaled version of the binary foreground frame chroma keying information for the third array comprising a scaled version of the data positions for the foreground frame, wherein the fourth array comprising a scaled version of the binary foreground frame chroma keying information comprises an array of plural binary flags, each binary flag corresponding to a region of the third array comprising a scaled version of the data positions for the foreground frame and having a binary value indicating whether the corresponding region of the third array comprising a scaled version of the data positions for the foreground frame has the predetermined color value; and storing the fourth array comprising a scaled version of the binary foreground frame chroma keying information for use with the third array comprising a scaled version of the data positions for the foreground frame.

* * * * *

UNITED STATES PATENT AND TRADEMARK OFFICE
CERTIFICATE OF CORRECTION

PATENT NO. : 11,323,678 B2
APPLICATION NO. : 14/949640
DATED : May 3, 2022
INVENTOR(S) : Bogusz et al.

It is certified that error appears in the above-identified patent and that said Letters Patent is hereby corrected as shown below:

In the Claims

Column 21, Line 23 (Claim 8, Line 13), please replace "keyin" with --keying--

Column 23, Line 16 (Claim 14, Line 28), please replace "the in" with --the filtering--

Signed and Sealed this
Fifth Day of July, 2022

Katherine Kelly Vidal
*Director of the United States Patent and Trademark Office*